United States Patent
Judet et al.

(10) Patent No.: US 9,366,150 B2
(45) Date of Patent: Jun. 14, 2016

(54) METHOD FOR MOUNTING A STATOR BLADING OF A TURBOMACHINE, AN ENGINE CASING AND A TURBOMACHINE COMPRISING AT LEAST ONE STATOR BLADING MOUNTED ON THIS ENGINE CASING

(71) Applicant: SNECMA, Paris (FR)

(72) Inventors: Maurice Guy Judet, Dammarie les Lys (FR); Jerome Etienne Robert Cameau, Lieusant (FR); Fabrice Marcel Noel Garin, Boissise la Bertrand (FR); Alain Paul Madec, Chartrettes (FR)

(73) Assignee: SNECMA, Paris (FR)

( * ) Notice: Subject to any disclaimer, the term of this patent is extended or adjusted under 35 U.S.C. 154(b) by 828 days.

(21) Appl. No.: 13/659,404

(22) Filed: Oct. 24, 2012

(65) Prior Publication Data
US 2013/0108434 A1 May 2, 2013

(30) Foreign Application Priority Data

Oct. 26, 2011 (FR) ...................... 11 59692

(51) Int. Cl.
*F01D 9/04* (2006.01)
*F01D 25/24* (2006.01)

(52) U.S. Cl.
CPC .............. *F01D 9/042* (2013.01); *F01D 25/246* (2013.01); *F05D 2230/60* (2013.01);
(Continued)

(58) Field of Classification Search
CPC .......... F01D 9/04; F01D 9/041; F01D 9/042; F01D 25/246; F05D 2230/64; F05D 2240/14; F05D 2250/71; F05D 2250/711; F05D 2250/712; F05D 2260/30; F05D 2300/501; F05D 2230/60; F05D 2250/70; F05D 2270/114; Y10T 29/49316; Y02T 50/672
See application file for complete search history.

(56) References Cited

U.S. PATENT DOCUMENTS 3,628,880 A * 12/1971 Smuland ................. F01D 5/189
                                                                                              415/115
4,384,822 A     5/1983 Schweikl et al.
(Continued)

FOREIGN PATENT DOCUMENTS

EP        1 382 801 A2    1/2004
EP        1 921 273 A1    5/2008
(Continued)

OTHER PUBLICATIONS

French Preliminary Search Report and Written Opinion issued Jun. 11, 2012 in corresponding French Application No. 1159692 filed on Oct. 26, 2011.

*Primary Examiner* — Christopher Verdier
*Assistant Examiner* — Adam W Brown
(74) *Attorney, Agent, or Firm* — Oblon, McClelland, Maier & Neustadt, L.L.P.

(57) ABSTRACT

The present disclosure aims at achieving a mounting of a turbomachine stator blading while avoiding a delicate machining process of the engine casing. It also aims at simplifying the mounting as well as at reducing the costs, and at decreasing the number of item references for the engine. To achieve these objects, the turbomachine uses an extension of the engine casing. A turbomachine comprises at least one stator blading for air or gas stream flowing on the internal engine casing. The stator blading comprises a rim which is assembled on a radial extension of engine casing with an axial fastener. In a preferred embodiment of the turbomachine, the engine casing presents an annular wall provided with fingers originating axially from this wall and extending according to a curvature so that they present a radial extension tip against the rim of the stator blading.

9 Claims, 2 Drawing Sheets

Figure 1:
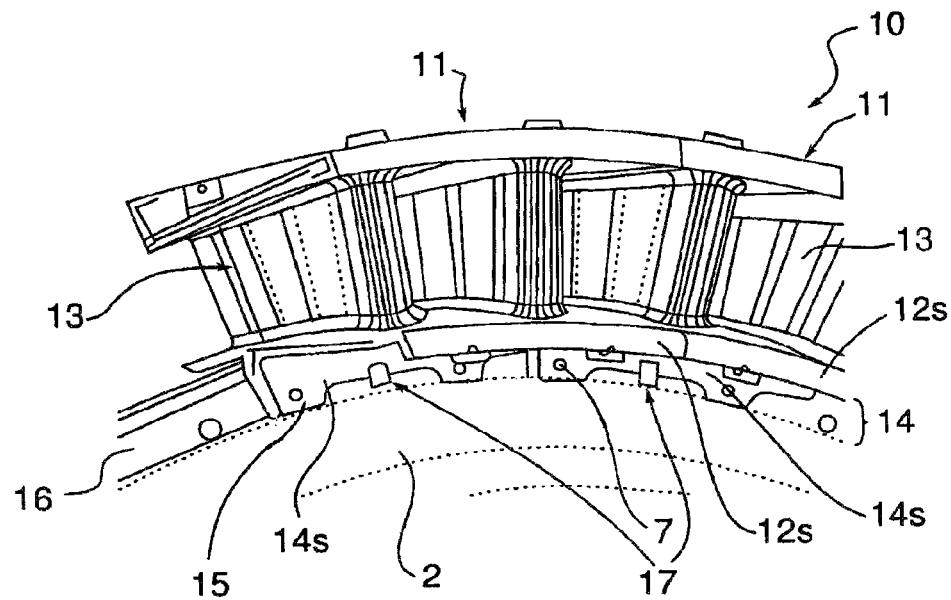

(52) U.S. Cl.
CPC ........ *F05D 2250/70* (2013.01); *F05D 2260/30* (2013.01); *F05D 2270/114* (2013.01); *F05D 2300/501* (2013.01); *Y02T 50/672* (2013.01); *Y10T 29/49316* (2015.01)

(56) References Cited

U.S. PATENT DOCUMENTS

| | | | |
|---|---|---|---|
| 4,856,963 A * | 8/1989 | Klapproth | F01D 9/042 |
| | | | 415/189 |
| 4,883,405 A * | 11/1989 | Walker | F01D 9/023 |
| | | | 415/137 |
| 5,224,822 A | 7/1993 | Lenahan et al. | |
| 5,653,580 A * | 8/1997 | Faulder | F01D 9/042 |
| | | | 415/137 |
| 5,839,878 A | 11/1998 | Maier | |
| 7,160,078 B2 * | 1/2007 | Coign | F01D 9/041 |
| | | | 29/889.22 |
| 8,033,786 B2 * | 10/2011 | Durocher et al. | 415/189 |
| 2004/0013519 A1 | 1/2004 | Correia et al. | |
| 2008/0008584 A1 | 1/2008 | Shteyman et al. | |
| 2008/0107530 A1 | 5/2008 | Bart et al. | |

FOREIGN PATENT DOCUMENTS

| | | |
|---|---|---|
| FR | 2 907 499 A1 | 4/2008 |
| GB | 2 069 064 A | 8/1981 |
| GB | 2 434 414 A | 7/2007 |

* cited by examiner

METHOD FOR MOUNTING A STATOR BLADING OF A TURBOMACHINE, AN ENGINE CASING AND A TURBOMACHINE COMPRISING AT LEAST ONE STATOR BLADING MOUNTED ON THIS ENGINE CASING

TECHNICAL FIELD

The invention concerns a method for mounting a stator blading of a turbomachine, in particular turbine nozzle guide vanes, where a turbomachine blading implementing this method can be supported by an engine casing, and a turbomachine comprising at least such an engine casing and a stator blading mounted on this engine casing. By turbomachine, one should understand turbojet engines and turboprops.

Generally, a turbomachine comprises a gas generator consisting of high pressure (HP) and low pressure (LP) compressors, a combustion chamber, and HP and LP turbines. Each HP or LP turbine drives HP and LP compressor stages via coaxial drive shafts. To this end, the combustion chamber mixes the intake air, compressed by the compressors, with the fuel and burns this mixture. Rotor bladings of the turbines, in particular of the HP turbine, take the ejected flow and expand it. The compressors being then also rotatably driven by the turbines.

Typically, stator bladings act towards compression and towards expansion. A stator blading alternates with a rotor blading from the upstream side to the downstream side of a turbomachine, whether in compression phase or in expansion phase.

In the compression phase, the rotor bladings of the compressors deflect the intake air flow towards the stator bladings, or "straighteners", which straighten the flow into the axis and transform the flow speed into a pressure increase. Compressed air is so transmitted to the combustion chamber. In the expansion phase, the flow of ejected gas is deflected by the stator bladings, or nozzle guide vanes, towards the rotor bladings in order to transform the high kinetic energy of the ejected gases into a torque. The rotor bladings thus drive the respective compressor stages.

More precisely, the field of the invention is the one of the assembly of the annular part of a stator blading. Generally, and as shown by the partial view of FIG. 1, a stator blading 10 is circumferentially divided in sectors, each sector 11 comprising an elementary platform 12s extending radially and outwardly into blades 13, and radially and inwardly into an elementary rim 14s. This rim comprises tabs 15 which are fixed axially on a radial wall 16 of the engine casing 2 with crimped pins 7. In the illustrated example, the stator blading 10 constitutes HP turbine nozzle guide vanes and the attachment engine casing 2 is an engine casing after combustion chamber. As reminded above, the blades 13 are, in this example, intended for directing the flow of combustion gases towards the blades of the rotor blading of the adjacent HP turbine wheel.

PREVIOUS STATE OF THE ART

During the flow deflection carried out by the blades 13 of the nozzle guide vanes 10, the nozzle guide vanes undergo a high stress. It is then known how to complement the assembly of the nozzle guide vanes 10 on the engine casing 2 with axial blocking pins 17. Each pin 17 is positioned against the rim 14s between the two fixing tabs 15.

However, when the engine is in operation, the nozzle guide vanes may tilt downstream, or even upstream, without the pins being totally able to stop these movements. As a matter of fact, the operating cycle of the engine, which is regulated through the combustion-expansion phases, entails irreducible tilting. The result of this is a localized wear of nozzle guide vanes and pins because the contact between each pin 17 and the facing rim 14s occurs according to an extremely narrow-width generatrix.

DISCLOSURE OF THE INVENTION

The invention aims at overcoming the drawbacks of wear mentioned above while avoiding a delicate machining process of the engine casing. It also aims at simplifying the mounting as well as at reducing the costs, and at decreasing the number of item references for the engine by eliminating the need for the pins.

To achieve these objects, the invention uses an extension of the engine casing.

More precisely, an object of the invention is a method for mounting a stator blading of a turbomachine, in particular turbine nozzle guide vanes, in which a rim of the stator blading is radially inserted between a radial extension of an engine casing and curved projections, axially formed along an annular extension of engine casing so that they extend radially with their tip against the rim. The rim is then fixed to the radial extension of the engine casing and the projections maintain the rim against the radial extension of the engine casing during this fixing operation. So, each projection presents a face of contact with the rim which exerts a pressure against this rim. The pressure is adjusted by the geometry of the projections and insertion so that the mechanical properties of the projections achieve a firm holding of the blading while allowing a tilting of this blading downstream and upstream without generating any stress which could cause a wear of the parts which are in contact.

The invention also relates to a turbomachine engine casing comprising a radial extension in the form of a radial rim and an annular extension in the form of an annular wall provided with fingers axially extending the annular wall and presenting radially extending tips. These tips can rest on a stator blading rim mounted on the radial rim into a gap formed between this rim and the finger radial tips, and in that the geometry of the fingers and gap is calculated so that the fingers exert the pressure according to the above method.

According to advantageous embodiments, the fingers originate axially from the annular wall then extend according to a curvature so that they present radial extension tips, the fingers can be evenly distributed along the annular wall, and/or these fingers can be palmate and possibly have different lengths.

An object of the invention is also a turbomachine comprising at least one stator blading mounted on an internal engine casing. The stator blading comprises a rim assembled on a radial extension of engine casing with axial fastening means. In this turbomachine, the engine casing presents the previous annular wall provided with fingers having at least one of the preferred characteristics as defined above.

According to particular embodiments, the stator blading is divided into adjacent sectors of elementary rims, and the fingers can be distributed on the annular wall so that each finger is in contact with two adjacent elementary rims. Besides, the stator blading can be nozzle guide vanes for exhaust gas of a turbomachine turbine, in particular of the HP turbine, or an air straightener of a turbomachine compressor.

LIST OF THE DRAWINGS

Figure 2:
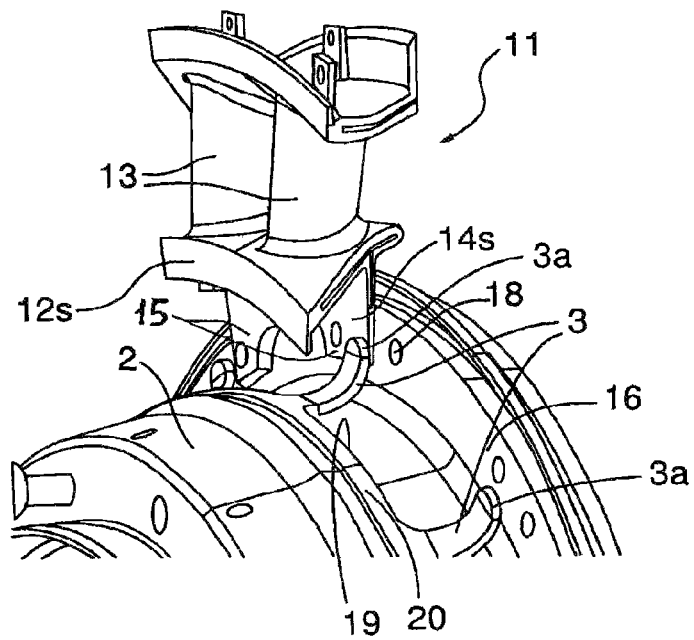
Figure 3:
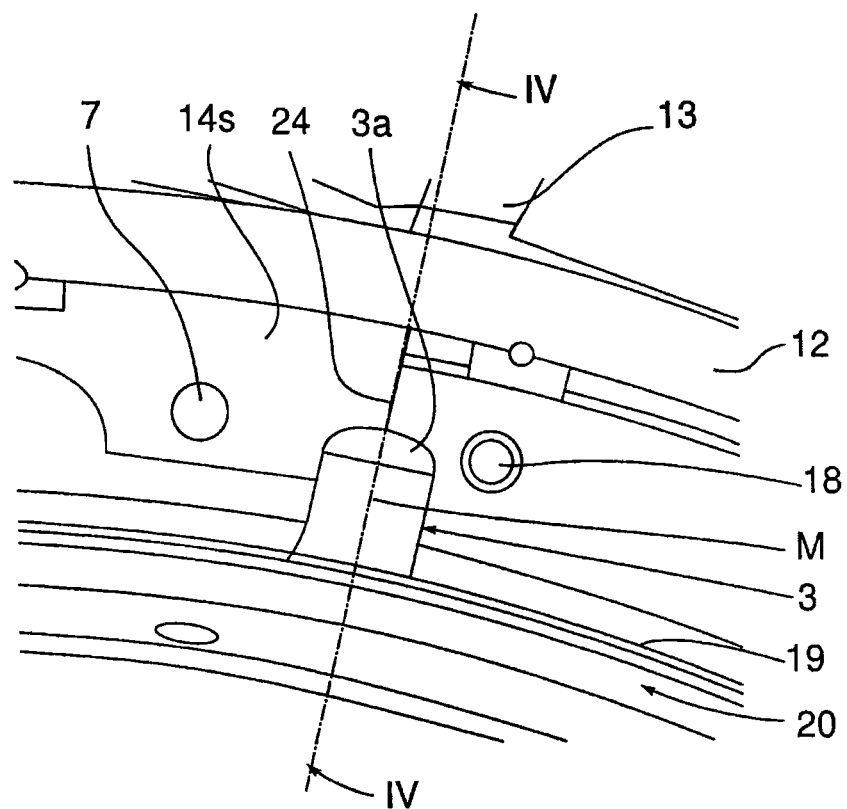
Figure 4:
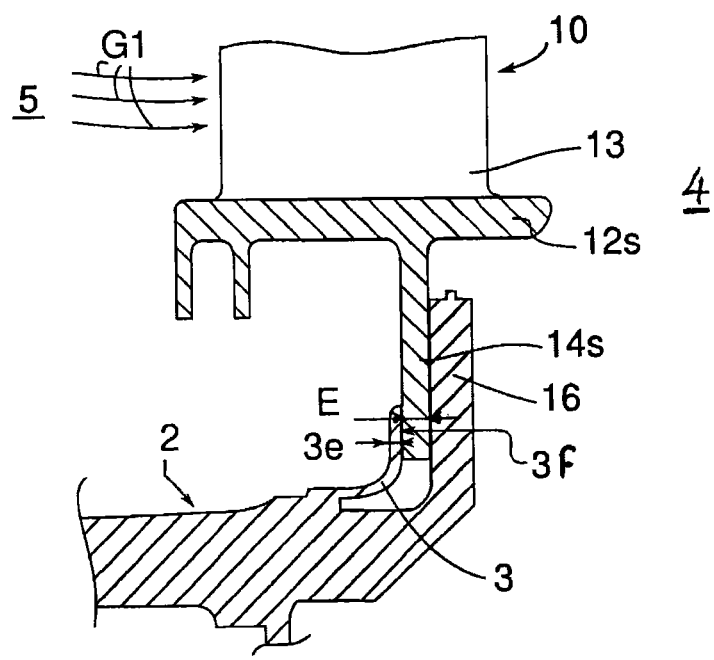

Other characteristics and advantages of the invention will emerge from the reading of the following description, in reference to the annexed drawings which represent, respectively:

FIG. 1, a partial perspective view of an assembly of nozzle guide vanes on engine casing according to prior art (already discussed);

FIG. 2, a partial perspective view of an exemplary assembly of nozzle guide vanes with an engine casing after HP turbine combustion chamber according to the invention;

FIG. 3, a partial front view of the assembly of the nozzle guide vanes on the engine casing of FIG. 2, and FIG. 4, a sectional view according to plane IV-IV of FIG. 3 at a finger of the example according to the invention.

DETAILED DESCRIPTION OF AN EXEMPLARY EMBODIMENT

Referring to perspective and front views of FIGS. 2 and 3, an example of an assembly of annular nozzle guide vanes 10 on the internal engine casing 2 after chamber of a HP turbine of a turbojet engine is illustrated. Only one sector 11 of the nozzle guide vanes 10 is shown. All elementary sectors identical to sector 11 are adjacently mounted to form an annular nozzle guide vanes.

As shown by the state of the art of FIG. 1, each sector 11 comprises two blades 13 mounted on an elementary platform 12s extending into the elementary radial rim 14s. Each elementary rim comprises two radial tabs 15 forming two extensions to be axially screwed on a radial wall 16 of the engine casing 2 through bores 18.

Furthermore, the engine casing 2 extends into fingers 3 which are evenly distributed along a border 19 of an annular wall 20 of the engine casing 2. These fingers axially originate from the border 19 and bend so as to end as tips 3a extending radially against the rim 14s.

Fingers are arranged with regard to rims 14s so that each finger 3 applies against two adjacent elementary rims corresponding to two consecutive sectors 11. This positioning of fingers 3 appears more accurately at FIG. 3 where the radial edge 24 of rim 14s substantially runs along the median "M" of the shown finger 3.

FIG. 4 shows, in the form of a section, the mounting of the nozzle guide vanes 10 of the HP turbine 4 on the internal engine casing 2 after combustion chamber 5. The flows of gas "G" ejected from the chamber are directed by the blades 13 so that they are received by the mobile blades of the HP turbine 4.

This FIG. shows more particularly the insertion of the rims 14s of the nozzle guide vanes 10 into the gap "E", formed between the radial wall 16 of the engine casing 2 and the fingers 3, as well as the fastening—during the subsequent mounting—of rim 14 to this wall 16 by means of crimped pins 7 through the bores 18 (see FIG. 3).

The thickness 3e and area of the contact face 3f of the fingers—intended to come and rest on rims 14s originating from platforms 12s—as well as the gap "E", between the contact face 3f of the fingers and the radial wall 16, are calculated, according to the employed material, so that the pressure exerted by the fingers against the rims 14s, after insertion and screwing of the rims, is included within a definite range.

This pressure range of the fingers is limited so as to reach a compromise between a firm holding of the rims 14s and a tilting of the nozzle guide vanes downstream (and possibly upstream). The mechanical properties (stiffness, elasticity) of the employed material, in this case a nickel alloy, allow to adapt the geometries of the fingers and gap "E". As a matter of fact, other metal alloys (in particular titanium-based ones), a composite material or steel may can be used, as well as combinations of these materials forming heat-resistant alloys, for example nickel or cobalt-based alloys. In the present case, the thickness of the fingers is 1.8 mm and the width of their tips is 16 mm.

The invention is not limited to the described and shown example. For instance, it is possible to carry out the holding of the rim of the blading against the radial wall of the engine casing by means of projections the shape of which is different from the shape of a finger, for example projections which widen towards their tip. Furthermore, the fingers can be grouped together two by two or more than two by two so as to "palmate" them together in order to increase the bearing surface. Besides, the projections can have different lengths.

The invention claimed is:

1. A turbomachine engine casing comprising:
an annular extension in the form of an annular wall; and
a radial extension in the form of a radial wall,
wherein the annular wall is provided with fingers which extend the annular wall axially and present tips in radial extension which can rest on a rim of a stator blading, which rim is mounted on the radial wall into an insertion gap formed between the radial wall and the finger radial tips, and a geometry of the fingers and the insertion gap is calculated so that the fingers exert a pressure against the rim within a range achieving a firm holding of the stator blading while allowing a tilting of the stator blading downstream and upstream.

2. The turbomachine engine casing according to claim 1, wherein the fingers originate axially from the annular wall then extend according to a curvature so that the fingers present radially extending tips.

3. The turbomachine engine casing according to claim 1, wherein the fingers are evenly distributed along the annular wall.

4. The turbomachine engine casing according to claim 1, wherein the fingers are palmate.

5. A turbomachine comprising the stator blading mounted on the engine casing according to claim 1, the rim of the stator blading assembled on the radial wall of the engine casing with an axial fastener.

6. The turbomachine according to claim 5, wherein the stator blading is divided into adjacent sectors of elementary rims, and the fingers are distributed on the annular wall so that each of the fingers is in contact with two adjacent elementary rims.

7. The turbomachine according to claim 5, in which the stator blading is one of nozzle guide vanes for exhaust gas of a turbomachine turbine and an air straightener of a turbomachine compressor.

8. The turbomachine according to claim 7, wherein the turbomachine turbine is an HP turbine.

9. The turbomachine engine casing according to claim 1, wherein the fingers have different lengths.

* * * * *